United States Patent [19]

Yoshimura et al.

[11] 4,202,621
[45] May 13, 1980

[54] RECORDING DEVICE

[75] Inventors: Shigeru Yoshimura, Yokohama; Katsuichi Shimizu, Hoya, both of Japan

[73] Assignee: Canon Kabushiki Kaisha, Tokyo, Japan

[21] Appl. No.: 911,141

[22] Filed: May 31, 1978

[30] Foreign Application Priority Data

Jun. 3, 1977 [JP] Japan .................................. 52/65416
Jun. 14, 1977 [JP] Japan .................................. 52/70074
Jun. 27, 1977 [JP] Japan .................................. 52/76391

[51] Int. Cl.² .......................................... G03G 15/00
[52] U.S. Cl. ............................... 355/14 R; 270/68 R; 271/DIG. 9; 355/3 SH
[58] Field of Search ................. 355/14 R, 3 R, 35 H, 355/16; 271/DIG. 9; 270/68 R, 68 A

[56] References Cited

U.S. PATENT DOCUMENTS

| 1,833,296 | 11/1931 | Mentges | 270/68 R |
| 1,969,049 | 8/1934 | Spiess | 270/68 A |
| 3,834,805 | 9/1974 | Pichierri | 355/8 |
| 4,110,030 | 8/1978 | Knechtel | 355/3 SH |

Primary Examiner—R. L. Moses
Attorney, Agent, or Firm—Fitzpatrick, Cella, Harper & Scinto

[57] ABSTRACT

A recording device for reproducing image information onto a recording medium as a visible image, the device including an original mounting table for supporting original containing information to be recorded, an original feeding device to feed the original into the mounting table an image original detector to detect arrival of the original at a predetermined position on the mounting table, an image recording device to record the image information in the original onto a recording sheet, instruction device for commencing recording of the image information onto the recording sheet based on a detected output of the original detector, a conveying device for conveying the image-recorded sheet, a device for stopping any selected image-recorded sheet conveyed by the conveyor, a folding device for folding the recorded sheet by further forwarding of the recorded sheet against the stopping device which hinders its further conveyance, and a tray to receive therein the recorded sheet either folded or non-folded.

41 Claims, 20 Drawing Figures

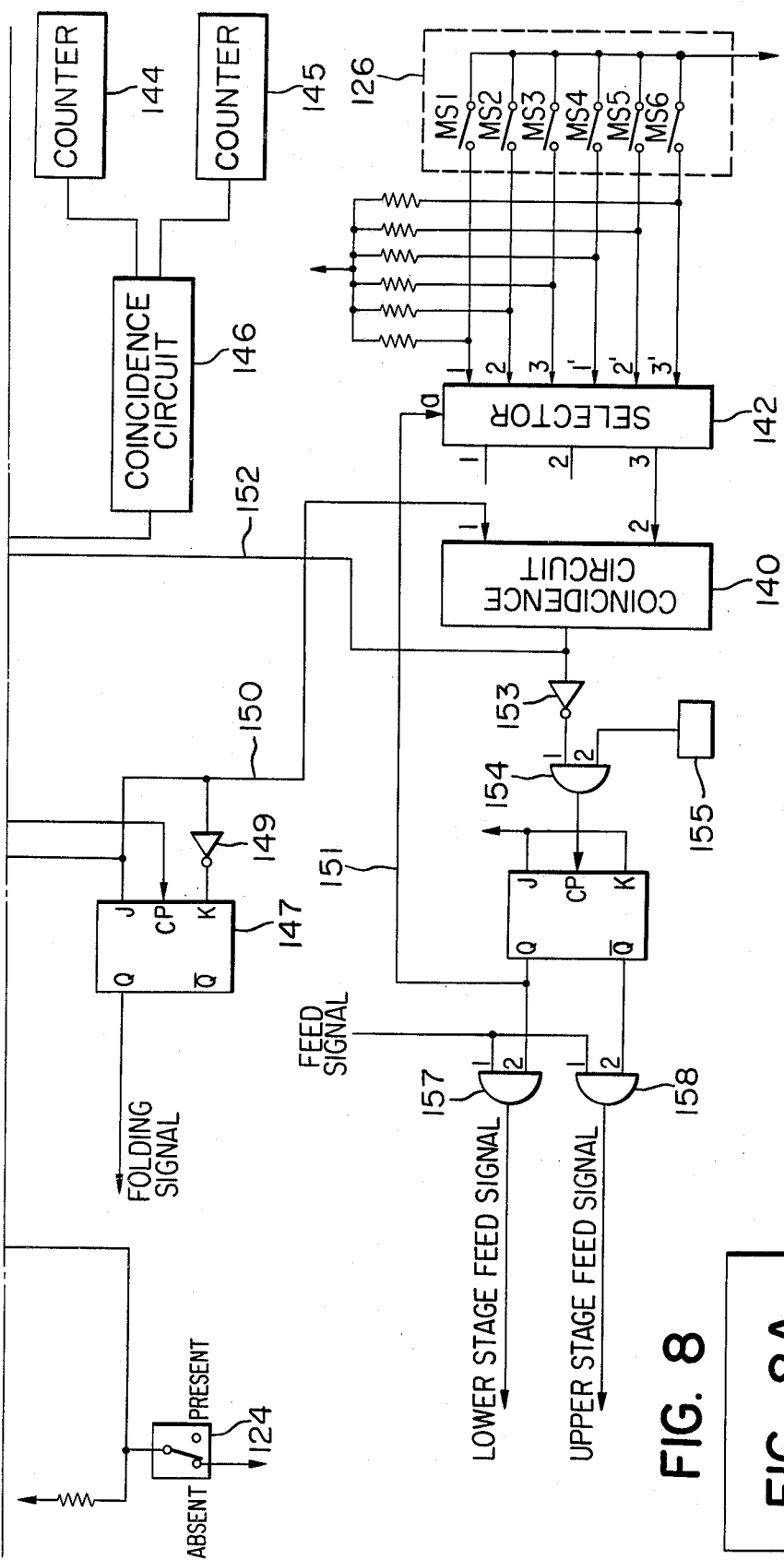

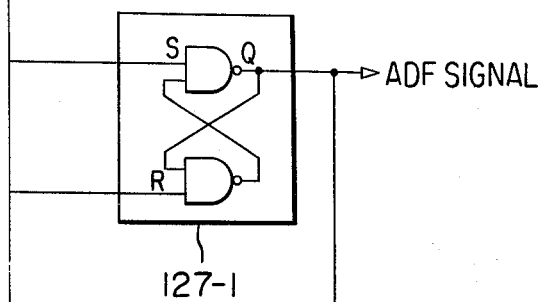
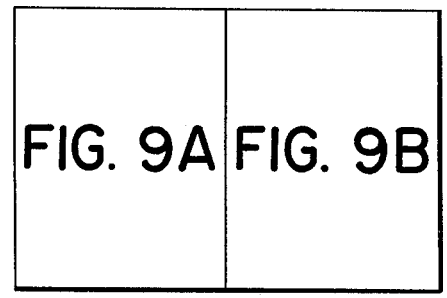
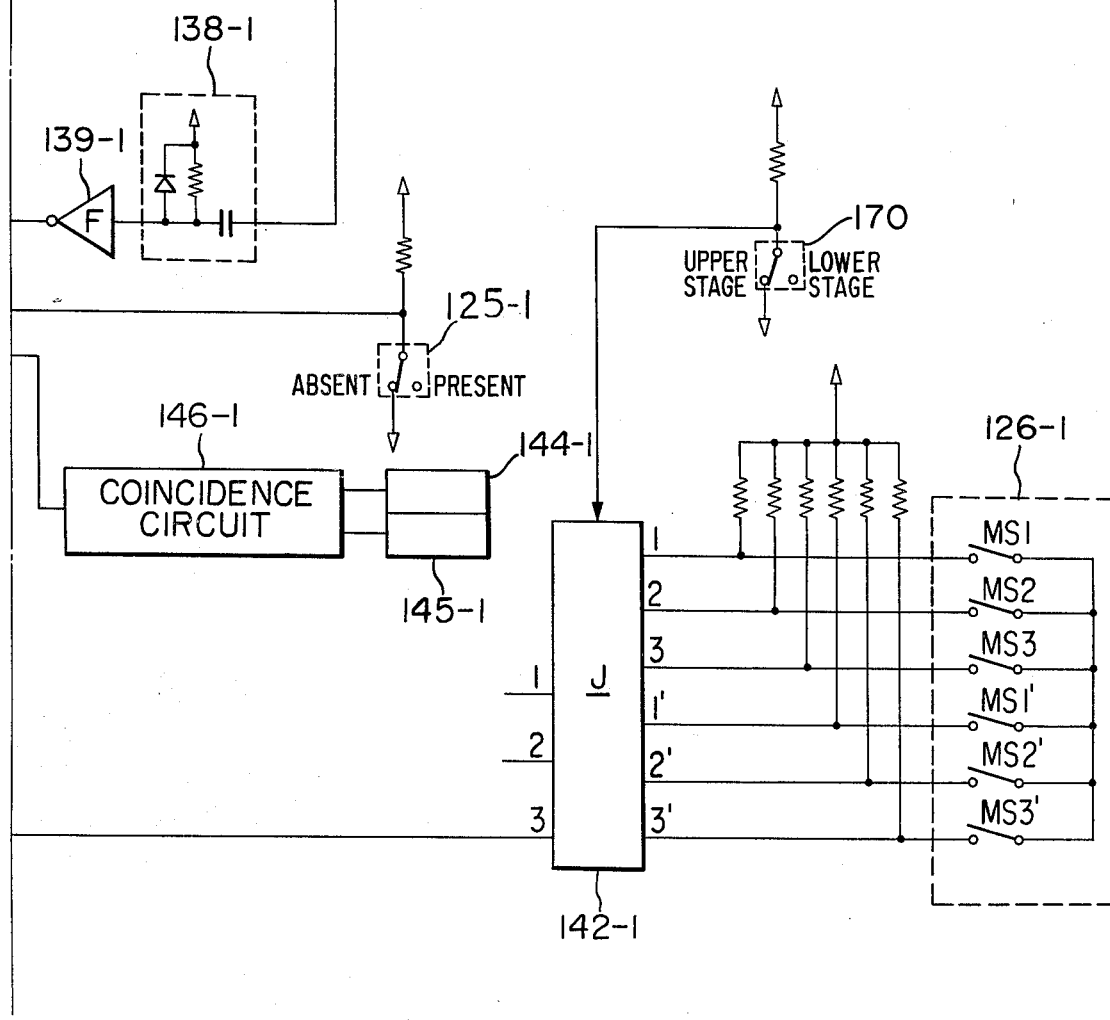
FIG. 9B
FIG. 9

RECORDING DEVICE

BACKGROUND OF THE INVENTION a. Field of the Invention

This invention relates to a recording device capable of automatically producing an image-recorded medium in a desired form.

b. Description of the Prior Art

There have been known various types of recording device, wherein image information is recorded on an image recording medium in a sheet form. All these recording devices, however, require human operators to attend all the time during the image recording operations so as to given the devices various instructions, or to carry out various pre-treatments and post-treatments.

It is generally desirable that such instructions to be given to the recording devices or such treatments for obtaining the image-recorded medium be performed by the device per se as far as possible so that the considerable amount of time to be spent by the human operators may be reduced. For example, when the sheet recording medium, on which image informations have been recorded, is large in size, the image-recorded medium should preferably be folded for storage. Heretofore, practice has been such that the sheet recording medium discharged from the recording device is folded by the operator, and after completion of the entire reproduction operations, all the image-recorded sheets are compiled in the order of reproduction. In an other aspect, in the recording device of a type in which an original is placed on an mounting table, and this original is optically scanned to record the image on the sheet recording medium, it has been necessary that, after predetermined numbers of copy sheets have been obtained from a single original, the operator removes this original and replaces it with a new image original placed at a predetermined location, after which instructions for commencement of the recording operations are given to the recording device.

As mentioned in the preceding, if the image-recording operations require many steps to be done by the operator, a considerable amount of processing time becomes necessary, even when the recording speed of the device per se is fast with the consequence that the over all recording speed of the device decreases substantially.

SUMMARY OF THE INVENTION

It is therefore an object of the present invention to provide a recording device capable of producing an image-recorded sheet medium, on which image informations have been recorded, in any desired form with the least pre- and post-treatment thereon being required by a human operator.

It is another object of the present invention to provide a recording device capable of discharging the image-recorded sheet medium in a folded state.

It is still another object of the present invention to provide a recording device capable of discharging the image-recorded sheet medium in a folded state in accordance with a size of the sheet recording medium.

it is other object of the present invention to provide a recording device capable of discharging the image-recorded sheet medium in a folded state in accordance with a size of an original.

It is still other object of the present invention to provide a recording device capable of automatically feeding a plurality of originals to be reproduced and of sequentially recording the image informations in each original onto the sheet recording medium.

It is a further object of the present invention to provide a recording device capable of selecting an appropriate sheet recording medium conforming to a size of the original by detecting the size of the image original to be reproduced.

BRIEF DESCRIPTION OF DRAWINGS

FIGS. 8A and 8B are a circuit diagram showing a main part of a control circuit for the recording device according to the present invention;

DESCRIPTION OF THE PREFERRED EMBODIMENTS

In the following, the present invention will be explained in detail for one embodiment thereof in reference to the drawings. First of all, one embodiment of the reproduction apparatus constituting a part of the present invention will be described.

The recording device according to this embodiment is a powder-development-and-image-transfer type reproduction apparatus, in which an image original to be reproduced may be of any type such as sheet as in general documents, books or like other bound papers, and so forth.

Figure 1:
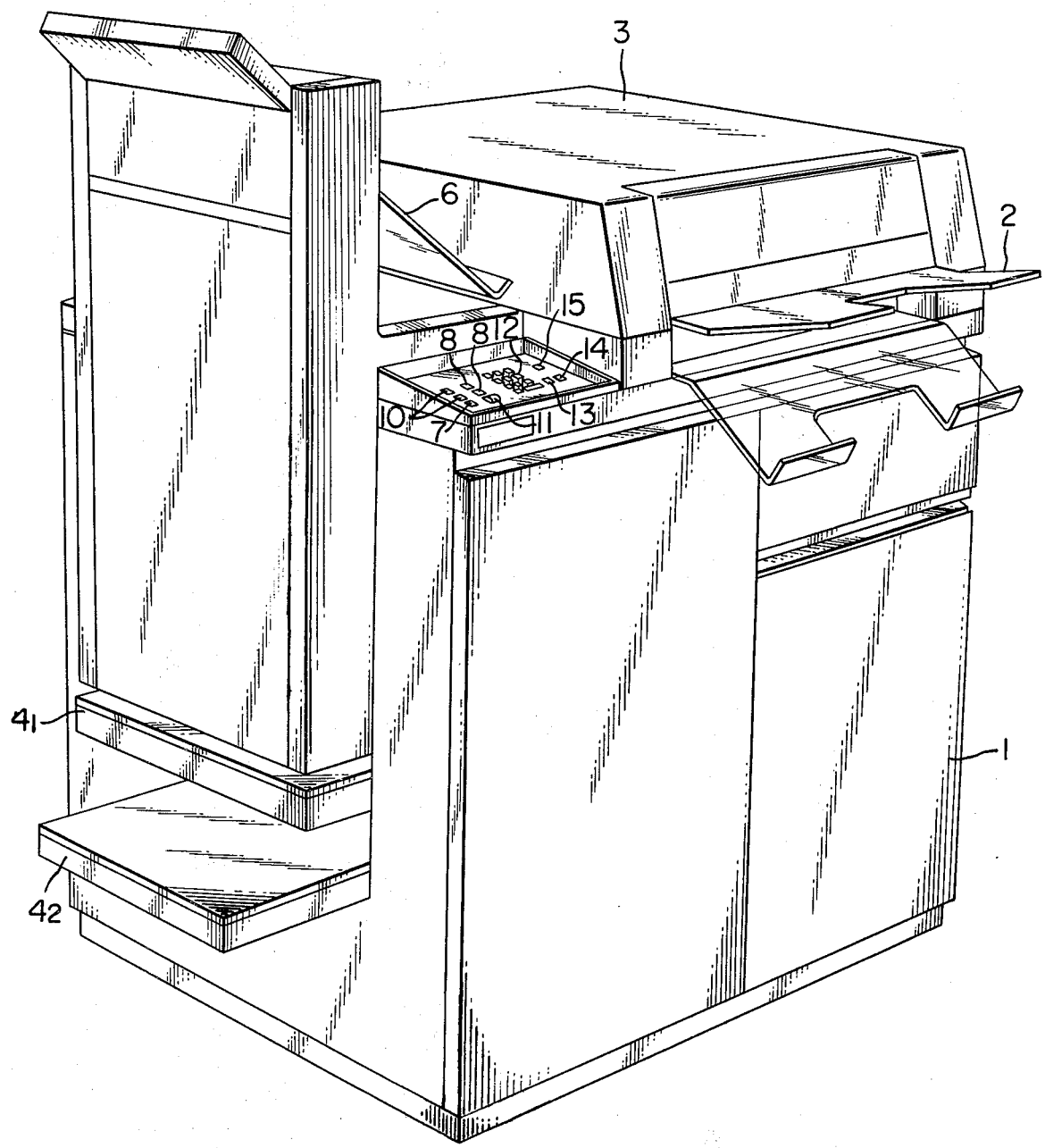
FIG. 1 is a perspective view showing an outer appearance of the recording device according to the present invention.
Figure 2:
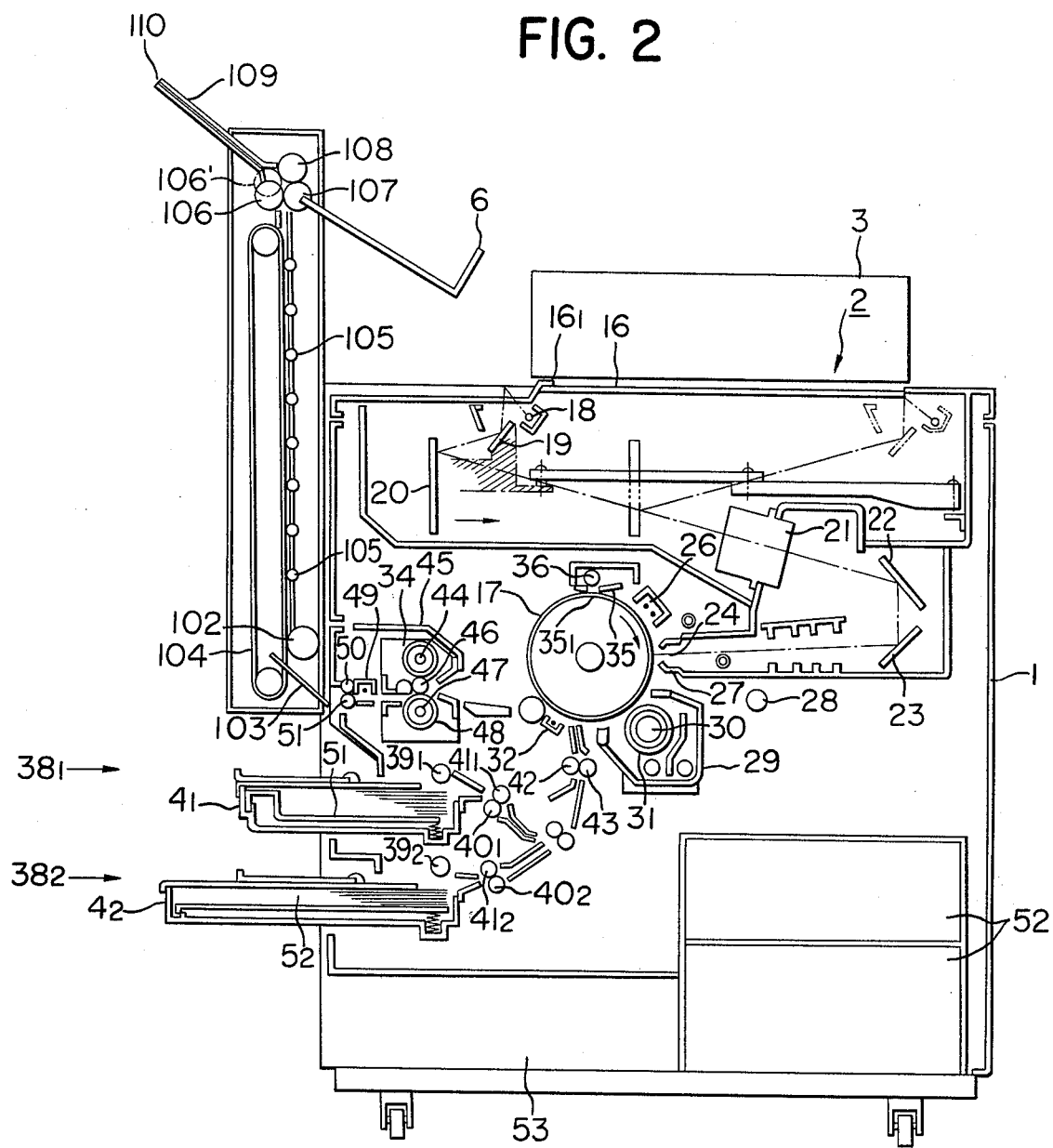
FIG. 2 is a cross-sectional view of the recording device shown in FIG. 1.

Referring to FIGS. 1 and 2, a reference numeral 1 designates a machine casing, 3 refers to an automatic document feeder (ADF) which sequentially feeds the image originals onto an image original mounting table 16 to be described later, and 2 denotes an image original stacking table, on which image originals to be fed to the original mounting table are stored in stack. $4_1$ and $4_2$ designate cassettes for accommodating therein image transfer paper $5_1$ and $5_2$ as the sheet recording medium, and 6 refers to a tray, on which the image transfer paper discharged out of the reproduction apparatus is temporarily stored after the image transfer operations. 7 refers to a main switch 8, warning indicator sections, 10 paper size indicator sections, 11 an image density adjusting dial, 12 a continuous reproduction sheet number selection key, 13 a continuous or multiple copy button interconnected with the continuous reproduction sheet number selection key 12, 14 a single copy button which is not inter-connected with the continuous reproduction. A hopper to accommodate therein developer for replenishment and to supply the same depending on necessity is disposed at a position of a front right door.

The operations of this reproduction apparatus will now be explained in reference to FIG. 2. An original to be reproduced is placed by the automatic original feeder 3 on the original mounting table 16 made of glass with the tip end thereof being registered with the extreme end 161 of the glass table. Next, when the single copy button 14 is depressed, or the continuous or multiple copy button 13 is depressed after the copy sheet numbers are set by the selection key 12, a photosensitive drum 17 commences its rotation in the clockwise direction as shown by an arrow. When the photosensitive drum 17 reaches a predetermined position and a signal for commencing image exposure is emitted, an illuminating lamp 18 and a first mirror 19, both of which are the movable parts in the optical system, begin to move in the right direction as arrowed in the drawing at the same speed as the circumferential speed of the rotating photosensitive drum 17, while a second mirror 20 also commences movement in the rightward direction at a speed half that of the circumferential speed of the drum. The image of the original which has been illuminated by the illuminating lamp 18 from below is focussed on the photosensitive drum 17 at its designated exposure section 24 as an information light. When the image exposure is completed, the movable parts of the optical system detect their positions, stop further rightward movement, and immediately return in the opposite direction, i.e., leftward. The speed at this returning motion is made faster than that at the forward motion so as to increase efficiency in reproduction operations. As soon as the movable parts have returned to their initial positions, the driving force to the movable optical system is interrupted and the operations stop.

In case multiple copies are to be obtained continuously from one and the same image original, the numbers of copy sheets as desired may be designated in the reproduction apparatus by means of the continuous reproduction sheet number selection key 12, followed by commencement of the reproduction operations through depression of the continuous or multiple copy button 13. Also, when the reproduction operations are started by means of the single copy button 14, such single copy can be obtained irrespective of the copy sheet numbers as instructed by the reproduction sheet number selection key 12.

The photosensitive drum 17 is of a three-layer structure consisting of an electrically conductive substrate coated thereon with a photosensitive layer, on which a transparent insulative layer is overlaid. This drum 17 rotates clockwise as shown in FIG. 2. This photosensitive drum 17 is first charged in the positive $\oplus$ polarity by a positive charger 26 which is supplied with an electric current in the positive polarity from a high voltage power source. After rotation, when the drum arrives at the image exposure section 24, it is exposed with an image of the original through a slit at this section, and, at the same time, subjected to an a.c. electric charge (charge removal) by an a.c. charger 27 which is supplied with an a.c. electric current from the high tension power source. Subsequently, by an overall exposure to be rendered thereon by an overall exposure lamp 28, an electrostatic latent image is formed on the surface of the photosensitive drum 17. After formation of the electrostatic latent image thereon, it further rotates to a position of a developing device 29. In this developing device 29, a magnet brush consisting of a carrier and a toner on a sleeve 31 rotating around a magnet 30 contacts the drum surface, whereby the electrostatic latent image on the photosensitive drum 17 is developed, and rendered visible. Subsequently, an image transfer paper 5 which has been forwarded from the paper feeding section closely contacts the peripheral surface of the photosensitive drum 17, and the developed image on the drum surface is transferred onto the image transfer paper 5 by electric charging of positive $\oplus$ current from the high voltage power source through an image transfer charger 32. The image transfer paper 5 which has completed its image transfer is separated from the photosensitive drum 17 with its one end being restrained by a separating belt, and led to an image fixing device 34. In the meantime, the the toner remaining on the photosensitive drum is wiped off with an edge $35_1$ of a cleaning blade 35, which press-contacts against the drum surface, so as to be ready for repeating the next reproduction cycle. The toner which has been wiped off the drum by the cleaning blade 35 rides thereon to be taken away from the area of the photosensitive drum 17 by a screw conveyor 36 to the front side of the drum, and is then led into the developing device 29 through a duct, and re-used for the development. The image transfer paper $5_1$ is placed in the cassettes $4_1$, and the image transfer paper $5_2$ in the cassette $4_2$, respectively. These cassette $4_1$ and $4_2$ are loaded in paper feeding sections $38_1$ and $38_2$ at the lower left portion of the production apparatus in a detachable attachable manner. The cassettes are various in size in conformity with sizes of the image transfer paper, and can be readily replaced depending on necessity. Selections of the paper feeding from the paper feeding sections $38_1$ or $38_2$ are effected by an automatic cassette selection device to be described hereinafter. When the photosensitive drum 17 arrives at a predetermined position to emit a paper feeding signal, a paper feeding roller $39_1$ or $39_2$ which is constantly rotating is urged on the top surface of the image transfer paper $5_1$ or $5_2$, whereby the paper is fed out in the rightward direction as shown in the drawing. Then, while it is being forwarded, the image transfer paper is rectified of its slant movement, if any, by first register rollers $40_1$, $41_1$, or $40_2$, $41_2$, so as to be forwarded in the correct, straightforwarded direction. Continuously, the image transfer paper 5, after it has taken synchronism with the image on the photosensitive drum 17 with a signal from the movable optical part by means of second register rollers 42, 43, is closely contacted on the drum surface to be subjected to the image transfer. After completion of the image transfer, the image transfer sheet is peeled off the surface of the photosensitive drum 17 by the separation belt, and sent into the image fixing device 34. In this image fixing device 34, the image transfer sheet having on its suface a non-fixed transferred image passes between a resilient image fixing roller 46 which has been heated by a heating roller 45 incorporating therein a heater 44 and an opposite roller 48 also having therein a heater 47, during which the paper and non-fixed image thereon are heated, the toner is fusion-bonded to the paper, and the image is firmly fixed on the image transfer paper 5. The paper which has passed through the image fixing device 34 is finally removed of any electric charge remaining on its surface by an electric charge remover 49, and is then discharged onto a guide plate 103 of a sheet folding device by means of discharge rollers 50, 51.

The photosensitive drum 17 of this reproduction apparatus is capable of performing reproduction of an A-3 paper size having a width of 297 mm and a length of 420 mm, and the circumference of the drum is slightly longer than the paper length of 420 mm. The return motion of the movable optical system followed by its forward motion (i.e., exposure process) is required to be somewhat shorter than the forward movement. Accordingly, in the case of A-3 size reproduction, the image-recording can be done per two revolutions of the photosensitive drum, while, in the case of A-4 size reproduction, the image recording can be done per one revolution of the drum with the image transfer paper being fed with its longer side as the width (breadthwise forwarding). The difference in the rotational cycle of the photosensitive drum due to the paper size as mentioned above is discriminated by a signal from the cassette $4_1$ or $4_2$ as selected by the automatic cassette selecting device, thereby controlling the moving quantity of the movable optical system.

After completion of the reproduction operations, the photosensitive drum stops its rotation when the rear end of the image transfer paper 5 has finished passing through the discharge rollers 50, 51. In this case, the drum is so made to stop at a position where the edge $35_1$ of the cleaning blade 35 may come to the vicinity of a seam of the photosensitive layer, i.e., to a portion where no image appears, in order to avoid may undesirable influence on the image arising from constant press-contact of the cleaning blade 35 on the surface of the photosensitive drum 17. Incidentally, reference numerals 52, 53 designate storage spaces for the image transfer paper 5, cassettes 4, developing agents, and other supplies.

In the following, detailed explanations will be given as to the automatic document feeder (ADF) in reference to FIGS. 3A and 3B.

An original switch 121 consisting of a detection element such as a microswitch is provided on one part of the original stacking table 2 of the ADF so as to detect whether the image original 202 is present on the table 2, or not.

The original to be used may be a full size (e.g. A-3 (297 mm × 420 mm), B-4 (257 mm × 364 mm) sizes), or a half size (i.e. half of the abovementioned full size such as A-4 (210 mm × 297 mm), B-5 (182 mm × 257 mm) sizes). The originals are placed on the original stacking table 2 in such a manner that, in the case of the full size original, it may be placed with its short side being conformed to the forwarding direction of the original, i.e. breadthwise forwarding, and, in the case of the half size original, it may be placed with its long side being conformed to the forwarding direction of the original, i.e., lengthwise forwarding.

Figure 8A:
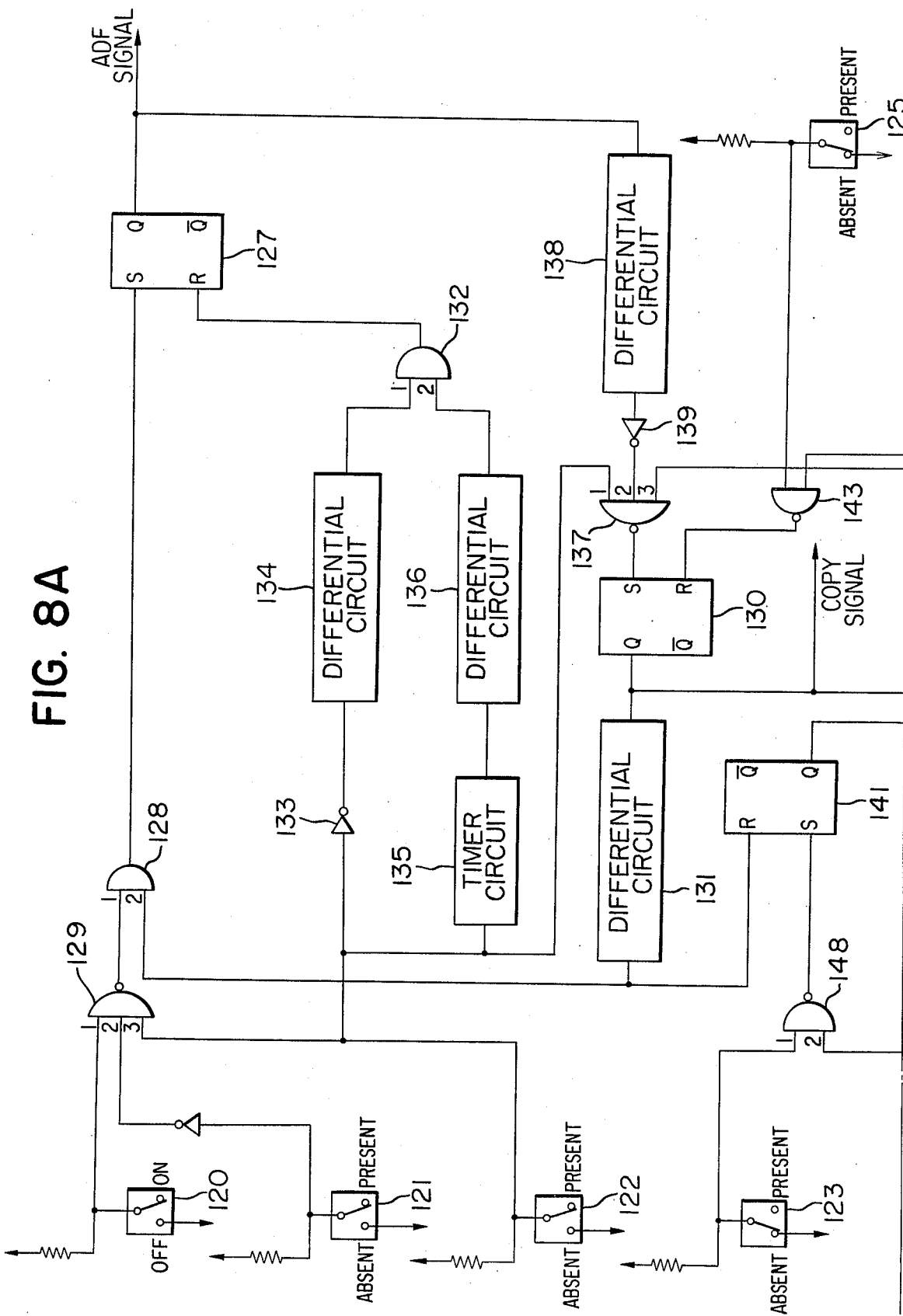

The original placed on the original stacking table 2 is lifted by a rotor 204, held between the rotor 204 and a roller 205, and carried to a conveyor belt 211. Timing for feeding out the image original is determined by lowering a timing roller 206 from its illustrated position. Passage of the image original fed out onto the conveyor belt 211 is detected by a switch 123 consisting of a light emitting element 208 and a light receiving element 209. That is, as shown in FIG. 3B, the switch 123 is disposed at a position where both full size original 202-1 (in solid line) and half size original 202-2 (in dot line) pass through without exception. This is shown in FIG. 8 as an image original detection switch 123.

Figure 3A:
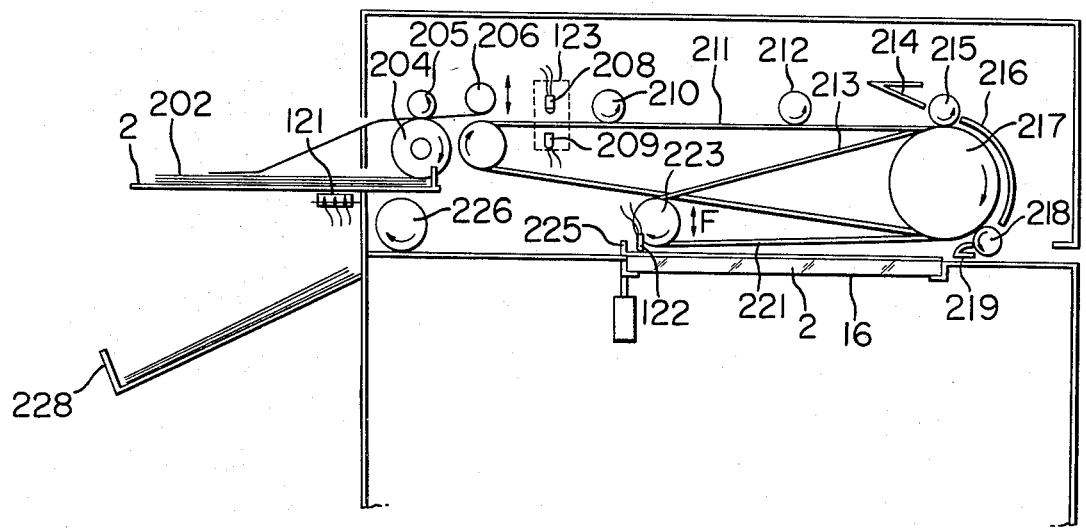
FIGS. 3A and 3B are respectively a cross-sectional view and a top plan view of an automatic original feeding device.
Figure 3B:
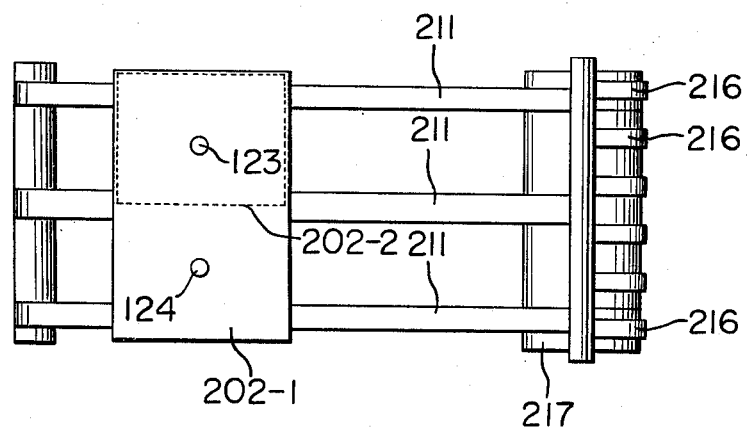

Juxtaposed with this switch 123, is a switch 124 of the same construction, as shown in FIG. 3B. This switch 124 is disposed at a position where the full size original passes, but the half size original does not pass therethrough. In FIG. 8, this is shown as an image original size detection switch 124.

It goes without saying that, when the half size original is forwarded breadthwise, and the full size original lengthwise, the size of the original can be detected from its passing time, and presence of the original can also be detected, whereby the abovementioned light emitting element and the light receiving element can be in a single set.

Owing to presence of urging rollers 210, 212 on the top surface of the conveyor belt 211, the original placed on this belt 211 is conveyed to the rightward direction in FIG. 3A and 3B and sent to the original mounting table 16 made of glass plate through a guide member 214, rollers 215, 217, a guide member 216, rollers 217, 218 and a guide member 219.

Between the abovementioned roller 217 and another roller 223, there is further extended a belt 221. Since the roller 223 moves up and down as shown by an arrow F, the original which has been sent to the original mounting table 16 can be further transferred to the leftward direction in the drawing by lowering the roller 223.

A stopper 225 is provided at the left end of the original mounting table 16, which works to stop further movement of the original when it collides with the stopper. At the same time, the rotation of a motor (not shown) is stopped by a detected output of the edge of the original from an original edge detector 122 to thereby stop driving of the conveyor belt and rollers for the original.

After completion of a predetermined reproduction of the original, a plunger 255-1 is driven by application of a stopper retraction signal, whereby the abovementioned stopper 225 retracts from the image original conveying path, the roller 223 moves downward and rotates to convey the original in the leftward direction in the drawing, and the original is discharged onto an original discharge tray 228 by means of a discharging roller 226.

In the following, explanations will be made as to the sheet feeding device in reference to FIGS. 2, 4, 5 and 6.

Figure 4:
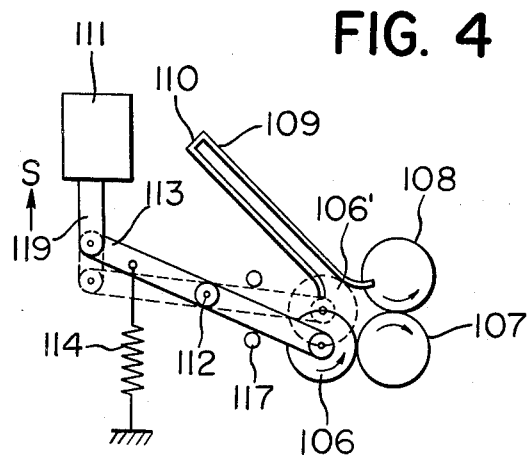
FIG. 4 is a cross-sectional view of a device for folding an image-recorded sheet medium.
Figure 5A:
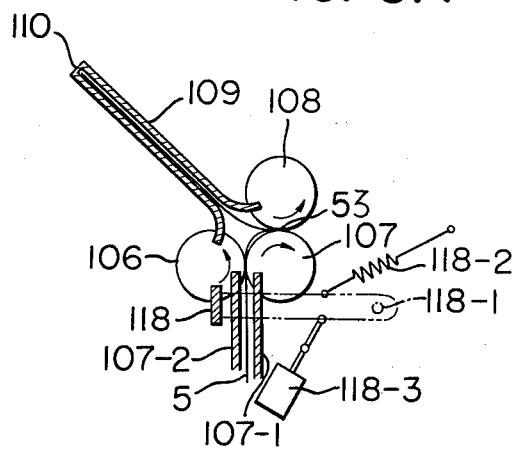
FIGS. 5A and 5B are respectively cross-sectional views of the sheet folding device, in which the former shows the device in its folding operation, and the latter shows the device after it has completed the folding operation.
Figure 5B:
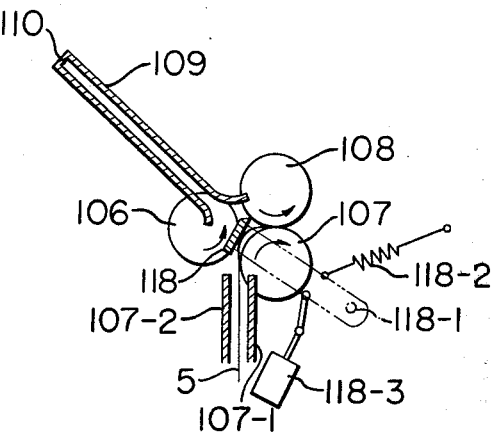

The image transfer paper 5 discharged by the rollers 50, 51 to a position lower than the level of the abovementioned original mounting table 16 is led by a guide plate 103, lifted upward by a forwarding roller 102 and a conveyor belt 104, and guided to the sheet folding section (or folding means) by urging rollers 105 through guide plates 102-1, 102-2. As shown in FIGS. 4, 5A and 5B, the sheet folding section consists of a pair of rollers 107, 108, a roller 106 to be controlled by a plunger 119 as in FIG. 5A or 5B, a sheet receiving and storing section 109 which temporarily stores any of the designated sizes of the image transfer paper 5 when it is to be folded, and a guide plate 118 fixed at one end of an arm 118-2 which is in turn held at the other end thereof on a shaft 118-1 in a freely rotatable manner.

The operations of this sheet folding section will be explained in the following. When the image transfer paper 5, which has been upwardly transported by the conveyor belt 104 and the urging rollers 105, is in the half size, no folding signal shown in FIG. 8 is emitted.

Accordingly, the guide plate 118 (regulating member) is at a position shown in FIG. 5B by a spring 118-2, while the roller 106 is at a position (shown in FIG. 5B) where an arm 113 and a stopper 116 contact each other as shown by a dot line in FIG. 4 by force of a spring 114 which pulls the arm 113 holding the roller 106 in a freely oscillatable manner by a shaft 112. Accordingly, the image transfer paper 5 which has been brought upward from below as shown in FIG. 5B is guided by the guide plate 118 between the rollers 107, 108, and discharged to a tray 6 as it is. Since this tray 6 is at a higher position than the original mounting table 16, the operator of the reproduction apparatus can take out the image transfer paper thereon very easily.

In contrast to this, when the image transfer paper 5 is in the full size, a "folding signal" is emitted from the circuit shown in FIG. 8.

When this folding signal is emitted, the guide plate 118 moves to a position shown in FIG. 5A by means of a plunger 118-3 which is an electro-magnetic actuating device, and, at the same time, the plunger 119 is driven in the direction of an arrow S against force of the spring 114 by means of a solenoid 111, and kept at a position where the arm 113 contacts the stopper 117 and stops further movement. In this consequence, the image transfer paper 5 is held between the rollers 106, 107, and is sent into the sheet receiving and storing section 109.

As shown in FIG. 5A, when the image transfer paper 5 is further transported upward by the rollers 106, 107, even after the tip end thereof collides with an end part 110 of the sheet receiving and storing section 109 (this end part constituting the engaging and stopping member of the image transfer paper), a part 53 of the image transfer paper 5 is bent, and gripped between the rollers 107, 108 to be folded, and then discharged onto the tray 6. Accordingly, by appropriately setting a distance between the engaging and stopping member 110 and the rollers 107, 108, the image transfer paper in the full size can be folded in half.

Figure 6:
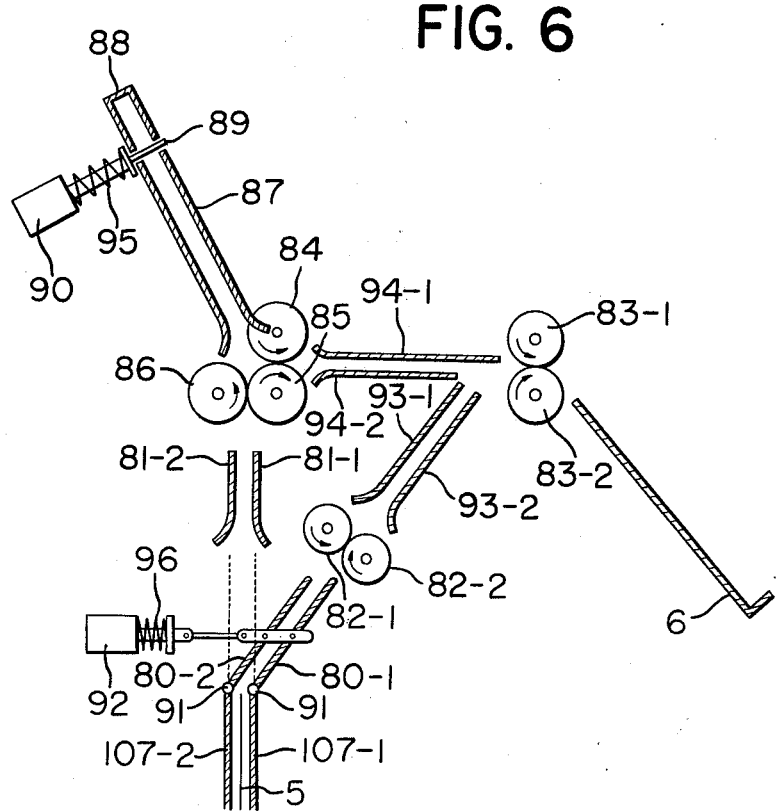
FIG. 6 is a cross-sectional view of another embodiment of the sheet folding device.

FIG. 6 shows another embodiment of the sheet folding section, wherein separate discharging sections are provided, the one for the folded image transfer paper 5, and the other for such image transfer paper which is not folded. In more detail, a pair of direction changing guide plates 80-1, 80-2 are pivotally provided on shafts 91, 91 at the end parts of the abovementioned guide plates 107-1, 107-2. The direction changing guide plates 80-1, 80-2 are so controlled that they may take two positions selectively by means of a plunger 92. That is, as shown in FIG. 6, they are controlled in such a fashion that the opening of the guide plates may be directed to a meeting point of the rollers 82-1, 82-2, and in such other fashion that the opening thereof may be directed to an opening of the guide plates 81-1, 82-2.

Since the rollers 82-1, 82-2 and 83-1, 83-2 are constantly rotating in the arrowed directions, the image transfer paper 5 which has been guided between the guide plates 107-1, 107-2 is further guided between the guide plates 80-1, 80-2 to reach the rollers 82-1, 82-2, if and when the abovementioned direction changing guide plate 80 is in a state as shown in the drawing by force of a spring 96 without their being driven by the plunger 92. The image transfer paper 5 held between the rollers 82-1, 82-2 is further guided by the guide plates 93-1, 93-2 to the rollers 83-1, 83-2, after which it is discharged on the tray 6. On the other hand, since rollers 84, 85, and 86 are also constantly rotating in the arrowed direction, if the abovementioned plunger 92 is driven against the force of the spring 96 so as to shift the opening of the direction changing guide plates 80-1, 80-2 to meet the opening of the guide plates 81-1, 81-2 (i.e., if the direction changing guide plates 80-1, 80-2 are shifted to the position indicated by dot lines in the drawing), the image transfer paper 5 passes through the guide plates 107-1, 107-2, the direction changing guide plates 80-1, 80-2, and the guide plates 81-1, 81-2, and then is led to the rollers 85, 86.

The image transfer paper 5 held between the rollers 85, 86 is forwarded into the sheet receiving and storing section 87, and is folded when its forward end contacts the engaging and stopping member 88, or 89. The folded end part of the paper is then held between the rollers 84, 85, after which it is discharged onto the tray 6 through the guide plates 94-1, 94-2 and the rollers 83-1, 83-2. The engaging and stopping member 89 is so constructed that it may be projected into, or retracted from, the abovementioned sheet receiving and storing section 87 by a plunger 90 in accordance with a size of the image transfer paper 5 to be folded.

While it is desirable that the folding section shown in FIGS. 4 to 6 should fold the image transfer paper 5 in half with respect to the conveying direction of the paper, if a distance between the engaging and stopping member 110 and the rollers 107, 108 is constant as shown in FIGS. 4 and 5, a folding length also becomes constant with the consequent inability to fold the same in half, when the paper size is changed. In order to avoid such inconvenience, the embodiment shown in FIG. 6 is so designed that, by changing the position of the engaging and stopping member depending on the paper size, it may always be folded exactly in half. For instance, when an A-3 size image transfer paper is fed, the plunger 90 is driven against the spring 95 to retract the engaging and stopping member 89 from the conveying path in the sheet receiving and storing section 87, whereupon the innermost wall 88 of the section 87 becomes the engaging and stopping member. Also, when a B-4 size image transfer paper is fed, the plunger 90 is not driven, but the engaging and stopping member 89 is caused to project into the sheet receiving and storing section 87 by force of the spring 95.

The control of the abovementioned plunger 92 can be done by use of a folding signal applied to the abovementioned plunger 111. Also, the control of the plunger 90 can be done in such a manner that outputs 1, 2, and 3, from a selector 142 to be described later, be decoded to discriminate a size of the selected cassette, and, when the size is, for example, A-3, the plunger 92 be driven.

Figure 7A:
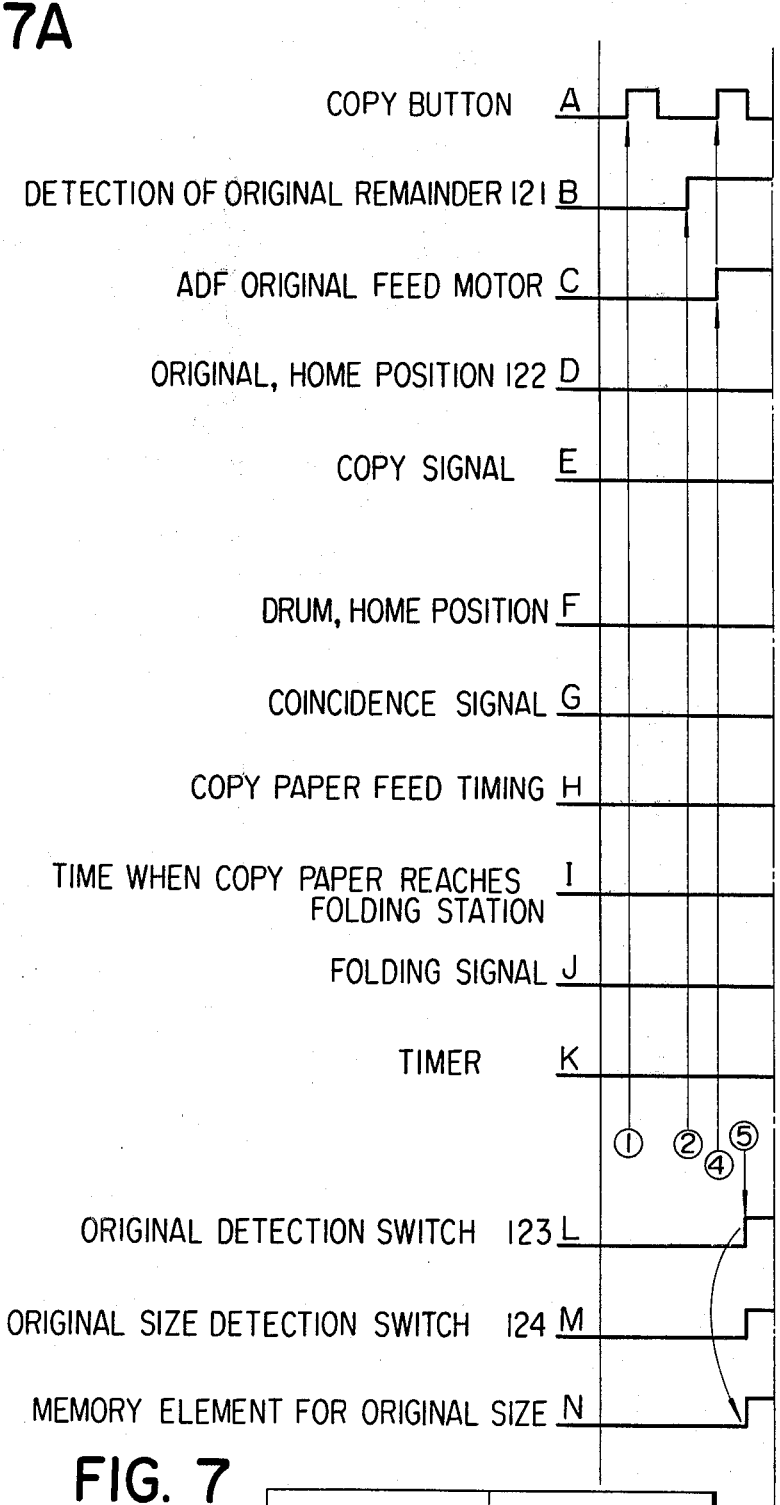
FIGS. 7A and 7B are a signal waveform chart showing operative states of the recording device according to the present invention.
Figure 7:
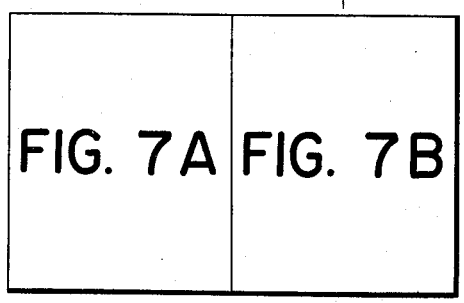
Figure 7B:
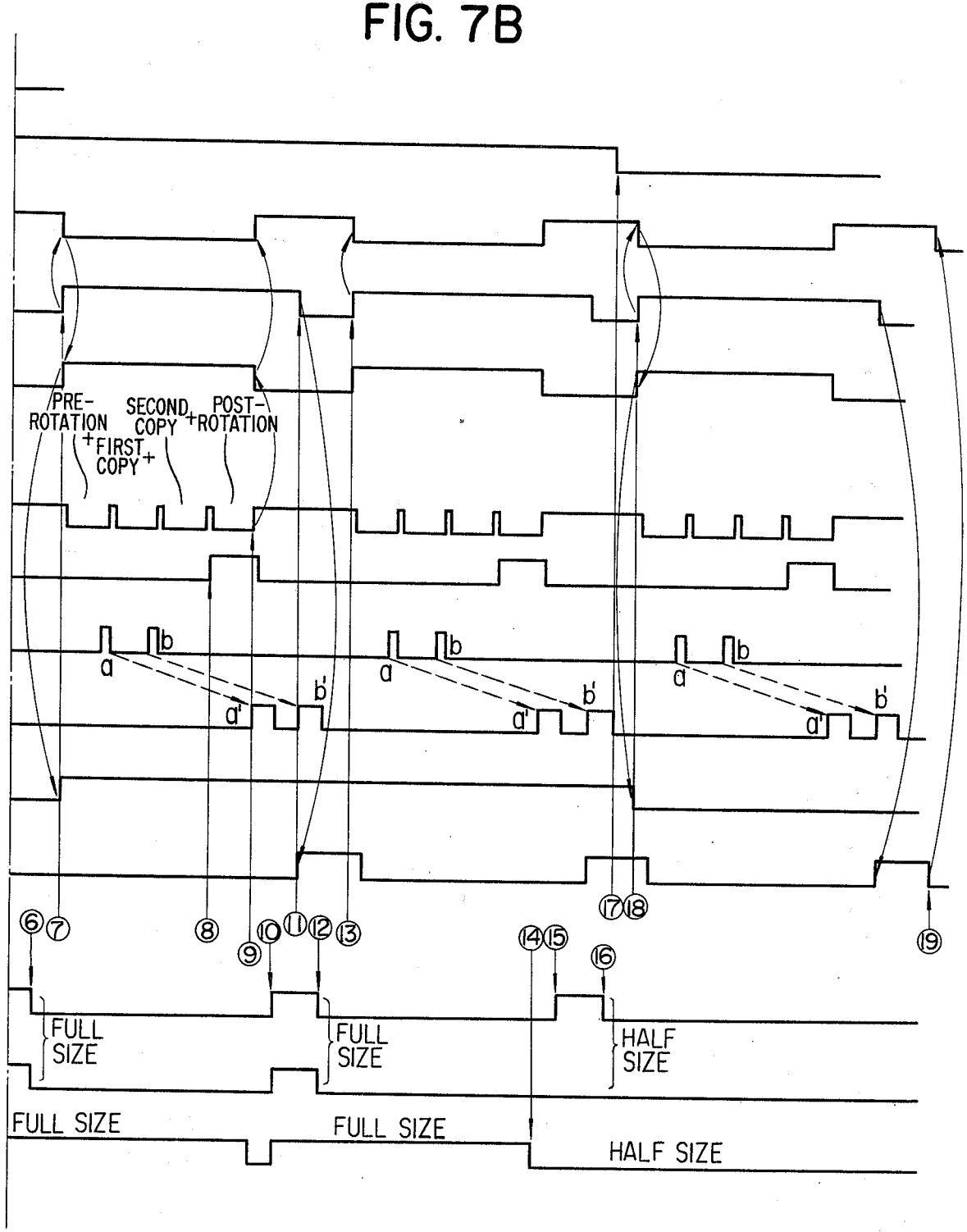

FIG. 7 is a timing chart for obtaining two copies each for every original forwarded to the original mounting table from the ADF by means of the reproduction apparatus according to the present invention. First, the timing 1 indicates that the operator pushed the copy button B, but no operation of the apparatus is effected, because there is no original set in the ADF. The timing 2 indicated that the operator, noticing that no original is set, has placed the originals on the original stacking table 2. The timing 4 indicates that the operator has again depressed the copy button, and that, as the result of this depression, the copying conditions have been set and the ADF original feeding motor is driven to take out one original from the stack and send it to the original mounting table. The timing 5 indicates that an original in full size (e.g. A-3 size) has been fed, the original detection switch 123 and original size detection switch 124 are actuated, and the original size memory element has been set. The timing 6 indicates that the abovementioned original has passed through the abovementioned switches 123 and 124. The timing 7 indicates that the tip end of the original which has been sent to the original mounting table has arrived at an adequate position to actuate an "original home position" switch 122. As the result of this, the "ADF original forwarding motor" is stopped to cause the original to stand still on the original mounting table. Further, this stoppage causes a "copy signal" to be turned on, thereby driving the reproduction apparatus. Simultaneously with this driving, a "folding solenoid 111" is excited in response to the operation of the original size memory element at the timing 5. The timing 8 indicates that the photosensitive drum has entered the post-rotating cycle after completion of the image transfer, wherein it is further rotated for one revolution to clean the drum surface, and the set number of copy sheet established by the operator has coincided with the copy sheet number. The timing 9 indicates that the photosensitive drum has arrived at its home position within the reproduction apparatus, while a "coincidence signal" is being generated. When these two conditions are met, the reproduction apparatus is stopped, and the "copy signal" is thereby turned off. Further, by this stoppage of the apparatus, the "ADF original forwarding motor" is again driven to discharge the original from the original mounting table, and to feed a new original thereto. In addition, the original size memory element set at the timing 5 is cleared so as to be prepared for storing therein a size of the subsequently fed original. At the timing 10, feeding of a full size original (e.g. A-3 size) is again detected to store the full size. The timing 11 indicates that the original which has so far been on the original mounting table is discharged outside the table perfectly. Further, by this discharge signal, a "timer" is set. This signal is actuated for the purpose of turning off the "ADF image original forwarding motor" with a trailing of this timer signal, when there is no original to follow subsequently with lapse of time set in "timer". The timing 12 indicates that the original has passed through the abovementioned image original detection switch 123 and the image original size detection switch 124. The timing 13 indicates that the second original has arrived at a predetermined position on the original mounting table within a time while the "timer" is not yet turned off to actuate the "original home position" switch 122. By this, the "ADF original forwarding motor" is turned off, as is the case with the timing 7, whereby the "copy signal" to actuate the reproduction apparatus is turned on. Also, since the original size memory element is set again to store therein that the original is in full size, the "folding solenoid 111" is kept in an excited condition, and the copy cycle is repeated in the same manner. At the timing 14, the starting operation for the original feeding is being done same as in the timing 4. The timing 15 indicates that an original in a half size (e.g. A-4 size) is being fed, since only the original detection switch 123 is set, whereby the original size memory element is not set, but the situation wherein the original is in a half size is stored. The timing 16 indicates that the abovementioned original has passed through the abovementioned switch 123. The timing 17 indicates that the second original is discharged from the original mounting table, the third and last original is fed thereinto from the original stacking table of the ADF, and the "remaining original detection" switch 121 is turned off, whereby the original remains on the original stacking table 2. The timing 18 functions the same as the timings 7 and 13, wherein, in response to the memory of the half size original, the "folding solenoid 111" is turned off. The timing 19 indicates that the "ADF original forwarding motor" is turned off, and the entire operations of the apparatus have been stopped, since no original appears even after lapse of the time set in the "timer" since the third and last original has been discharged from the original mounting table.

Now consider a relationship between the operation of the original size memory element and the time, in which the image transfer paper reaches the sheet folding section. Since the circuit according to the present invention is to constructed that it may respond to the rising time of the copy signal, i.e., the time instant when the reproduction apparatus commences the copying operations, and, also, as is apparent from the timing chart, since the time instant b', in which the last copy sheet for each original reaches the sheet folding section, is one, during which the ADF is feeding a subsequent image original to the original mounting table, there is no possibility of such an inconvenience to take place that the "folding solenoid 111" is changed over during any arbitrary time, in which the copy paper is subjected to the folding operation in the apparatus.

FIG. 8 shows a circuit embodying the timings in FIG. 7 according to the preceding explanations.

The control circuit shown in FIG. 8 takes thereinto various input signals from a copy button switch 120 to instruct the copying operations (the output waveform of which is shown by A in FIG. 7), a remaining quantity detection switch 121 to detect whether the originals still remain in the stack (the output waveform of which is shown by B in FIG. 7), an original switch 122 to detect whether the original is rightly placed at its home position (the output waveform of which is shown by D in FIG. 7), an original detection switch 123 to detect presence of the original (the output waveform of which is shown by L in FIG. 7), an original size detection switch 124 to detect a size of the original (the output waveform of which is shown by M in FIG. 7), a drum detection switch 125 to detect whether the photosensitive drum is at its home position (the output waveform of which is shown by F in FIG. 7), and a cassette switch 126 to be actuated in accordance with the size of the image transfer paper stored in the cassette, when the cassette is loaded in the reproduction apparatus.

Each of the above-mentioned switches, when it contacts to the side of "present" or "on" as in FIG. 8, leads out a high level signal to the contact, and a low level signal when it contacts to the other side, i.e. "absent" or "off". In the case of the cassette switch, however, the situation is just the opposite to the above. Since these switches are of such types that have already been explained, or of well known types, detailed explanations thereof will be dispensed with.

The control circuit shown in FIG. 8 leads out various output signals with the abovementioned various switches as the input signals therefor: "ADF signal" (a waveform C in FIG. 7) to instruct driving of the ADF original forwarding motor; "copy signal" (a waveform E in FIG. 7) to instruct execution of the copy cycle; "folding signal" (a waveform J in FIG. 7) to instruct actuation of the folding solenoid in order to discharge the image transfer paper to the tray 6 after it is image-transferred and folded; and "upper cassette feeding signal" or "lower cassette feeding signal" to instruct driving of the paper feeding roller $39_1$ or $39_2$ in order to feed out the image transfer paper stored in the upper stage cassette or the image transfer paper stored in the lower stage cassette.

The abovementioned ADF signal is formed by a set output in the RS flip-flop 127. There can be considered two kinds of timing, wherein this ADF signal is led out. They are represented by the timings 4 and 9 in FIG. 7. The case represented by the timing 4 is such that a low level signal output is led out into the input 1 of an AND gate 128 (this AND gate is in such a logic that it leads out a low level output when a low level signal (L signal) is applied to either input 1 or 2 to set the flip-flop 127). The case represented by the timing 9 is such that the low level signal is introduced into the input 2 of the AND gate 128.

In the above-described case represented by the timing 4, the logic is constructed by an AND gate 129, so that, when the copy button switch is turned on in the state of the original remaining quantity detection switch 121 being set to the side "present" and the original switch 122 being set to the side "absent", the entire inputs 1, 2, and 3 of the AND gate 129 take the high level, while its input takes the low level, thereby setting the flip-flop 127.

In the above-described case represented by the timing 9, the abovementioned flip-flop 127 is set by actuating a differentiation circuit 131 by an output Q of the RS flip-flop 130 which leads out the "copy signal", and then introducing the low level differential pulse corresponding to the trailing of the flip-flop 130 into the input 2 of the AND gate 128 as an input.

There can be considered two cases, wherein the flip-flop 127 is reset and the ADF signal stops its emission. They can be represented by the timings 7 and 19 in FIG. 7. The case represented by the timing 7 is such that the low level signal is applied to the input of the AND gate 132 in FIG. 8, while the case represented by the timing 19 is such that the low level signal is applied to the input 2 of the AND gate 132. The AND gate 132 is constructed in such a logic that it may lead out a low level output signal when a low level signal is introduced into any of the inputs 1 and 2 to reset the flip-flop 127.

In the abovementioned case represented by the timing 7, the flip-flop 127 is reset by actuating the differential circuit 134 with an inverter output when the original switch 122 has been changed over to the side "present", i.e., when the output of the inverter 133 has changed from the high level to the low level, and then by applying a low level pulse signal generated in the differential circuit 134 to the input 1 of the AND gate 132.

In the above-described case represented by the timing 19, a timer 135 is set when the original switch 122 has been changed from "present" to "absent", and a high level signal is led out therefrom for a predetermined time period. When this timer 135 changes its output from the high level to the low level with lapse of a predetermined time, the differential circuit 136 is actuated to apply the low level pulse signal to the input 2 of the AND gate 132, thereby resetting the flip-flop 127.

Although the abovementioned "copy signal" is constructed with an output signal of the RS flip-flop 130, there may also be such a case that this flip-flop 130 is set as represented by the timing 7 in FIG. 7. In this case, an output of a NAND gate 137 is applied to the set terminal of the flip-flop 130, and an output of the abovementioned original switch 122 is applied to the input 1 of this NAND gate 137.

As described above, such application of the output from the original switch 122 is to cause the flip-flop 130 to be set only when the original switch 122 is at the side of "present", and to cause the flip-flop 130 not to be set by, for example, the timing 19 in FIG. 7.

The trailing of the output Q of the flip-flop 127 is differentiated by the differentiation circuit 138, and a low level differentiation pulse is generated at an instant when the output changes from the high level to the low level. This differentiation pulse is further inverted by the inverter 139, after which it is applied to the input 2 of the NAND gate 137.

An output of a coincidence circuit 140 is applied to the input 3 of the NAND gate 137, and an output of an RS flip-flop 141 as the original size memory element is applied to the input 1 of the coincidence circuit 141, and a size signal output of the cassette selected by the selector 142 is applied to the input 2 thereof. Accordingly, only when the original size signal applied to the input 1 of this coincidence circuit 140 meets the size (which means both the full size and the half size) of the image transfer paper stored in the cassette selected by the selector 142, a high level signal can be led out in the output of the coincidence circuit 140, and this high level signal is applied to the input 3 of the abovementioned NAND gate 137.

As the result, the abovementioned flip-flop 130 is set when the original switch 122 is at the side of "present", the original size signal coincides with the size of the image transfer paper, and the flip-flop 127 changes from its set condition to its reset condition.

The resetting of the flip-flop 130 and stoppage in emission of the copy signal are represented by the timing 9 as shown in FIG. 7. In more detail, this flip-flop 130 is reset by an output from the NAND gate 143, wherein an output of the drum detection switch 125 is applied to the input 1 thereof, and an output of the coincidence circuit 146, which leads out the high level signal when the contents of the counters 144, 145 are coincided as the result of comparison, is applied to the input 2 thereof.

Incidentally, the counter 144 is to store therein the number of copy sheet set by the abovementioned copy sheet number setting key 12, while the counter 145 is to count the number of copy sheet to be copied from one and the same original.

The folding signal is composed of an output Q of a JK flip-flop 147. To the J-terminal of this flip-flop 147, there is applied an output Q of the abovementioned flip-flop 141, while an output Q of the flip-flop 130 is applied to the CP-terminal thereof. The flip-flop 141 receives an output of the NAND gate 148 to its set terminals. To the input 1 of this NAND gate 148, there is applied an output of the original detection switch 123, and to the input 2 thereof, there is applied an output of the original size detection switch 124. Therefore, the flip-flop 141 can be set only when the outputs of both switches 123, 124 are at the side of "present". In other words, while the flip-flop 141 is leading out the output Q, the original size is shown to be in the full size (which is required to be discharged in a folded state). On the other hand, when output Q is not being led out therefrom (a state, wherein the original detection switch 123 is at the side of "present", and the switch 124 is at "absent"), no output Q is led out, and the original size is shown to be in the half size (which is not required to be discharged in the folded state).

As is apparent from the foregoing explanations, the folding signal is led out when the full size signal is led out of the flip-flop 141, and the copy signal is led out of the flip-flop 130.

Since an output of the abovementioned differentiation circuit 131 is applied to the reset input of the flip-flop 141, and the output Q of this flip-flop 141 is applied to the K-terminal of the flip-flop 147 through the inverter 149, the flip-flop 147 stops emission of the output Q (emission of the solenoid signal) by the level change in the copy signal from low to high in the state of the original size having been detected to be in the half size, as shown in the timing 18 of FIG. 7.

The abovementioned size signal is applied to the abovementioned coincidence circuit 140 through a signal line 150. In the following, more detailed explanations will be given as to leading out of the upper cassette feeding signal and the lower cassette feeding signal.

The abovementioned cassette switch 126 has a group of three switches MS1 to MS3 to be actuated when the cassette $4_1$ is loaded in the upper cassette mount, and another group of three switches MS4 to MS6 to be actuated when the cassette $4_2$ is loaded in the lower cassette mount. Each of the switches MS1 to MS6 is controlled as shown in the following Table in accordance with the size of the image transfer paper stored in the cassette as loaded (i.e., cassette size).

TABLE

| Cassette size | Switch | | | | |
|---|---|---|---|---|---|
| | MS1 or MS4 | MS2 or MS5 | MS3 or MS6 | | |
| A3 | OFF | OFF | OFF | F | S |
| B4 | ON | OFF | OFF | U | I |
| U1 | OFF | ON | OFF | L L | Z E |
| A4 | OFF | OFF | ON | H | S |
| B5 | ON | OFF | ON | A L | I Z |
| U2 | OFF | ON | ON | F | E |

(NOTE: "U" denotes a universal cassette.)

A selector 142 is so constructed that the outputs of the switches MS1 to MS3 may be produced at the outputs 1 to 3 thereof, when the outputs of the switches MS to be controlled as mentioned above are applied to the selector 142, while a low level signal is led out to the signal line 151 to be applied to the terminal a thereof, and that the outputs of the switches MS4 to MS6 may be produced at the outputs 1 to 3 thereof, when a high level signal is led out to the signal line 151 to be applied to the terminal a. Therefore, paying attention to the output 3 of the selector 142, if the high level signal is led out of this output 3 due to turning off of the switches MS, the full size cassette is selected, as is apparent from the above Table, and, if the low level signal is led out thereof due to turning on of the switches MS, the half size cassette is selected. Accordingly, in case the output Q of the abovementioned flip-flop 141 is applied to the input 1 of the coincidence circuit 140, and the signal of the output 3 of the selector 142 is applied to the input 2 thereof, the coincidence circuit 140 leads out the high level signal when the original size and the cassette size are coincided (e.g., both in the full size), and it leads out the low level signal when the original size and the cassette size are not coincided, (e.g., one in the full size and the other in the half size).

Accordingly, when the original size and the cassette size are not coincided, no set signal input is introduced into the flip-flop 130, hence no copy signal is led out, because a low level signal is applied to the NAND gate 137 through the signal line 152. This low level signal is also applied to the input 1 of the AND gate 154, after it is rendered a high level signal by the inverter 153. Further, as an oscillating output of an oscillator 155 (the oscillating output varies between the high level and the low level) is applied to the input 2 of the AND gate 154, a pulse having a higher level than that of the AND gate 154 is applied to the CP-terminal of the JK flip-flop 156 by application of an initial high level pulse in the oscillating output. Then, the flip-flop 156 is inverted by application of such pulse, whereby the signal level on the signal line 151 also changes, and the cassette to be selected is changed from the upper cassette mount to the lower cassette mount, or vice versa.

As the result of changing the cassette to be selected as mentioned in the preceding, when the original size and the cassette size become coincident, the low level signal is applied to the input 1 of the AND gate 154, so that the oscillating output of the oscillator 155 is not applied to the CP terminal of the flip-flop 156, and this coincided state is maintained. Since the output Q of the flip-flop 156 is applied to the input 2 of the AND gate 157, the output $\overline{Q}$ thereof is applied to the input 2 of the AND gate 158, and the image transfer paper forwarding signal (such signal is well known in the ordinary reproduction apparatus) is applied to the inputs 1 of the respective AND gates 157, 158, there can be realized automatic cassette selection depending on the size of the original, when the output from the AND gate 157 is made a solenoid actuating signal for actuating an electro-magnetic driving device (not shown) to urge the paper feeding roller $39_2$ onto the image transfer paper $5_2$ in FIG. 2, and the output from the AND gate 158 is made the solenoid actuating signal for actuating an electro-magnetic driving device (not shown) to urge the paper feeding roller $39_1$ onto the image transfer paper $5_1$ in FIG. 2.

It should, however, be noted that, in the abovedescribed embodiment, the original is in either the full size or the half size, although the paper size belonging to the full size and the half size, respectively, is of three kinds as exemplified in the foregoing, hence it cannot always be said that the original size accurately coincides with the paper size. In order to avoid such inconvenience in the practical operation, the reproduction apparatus of the present embodiment is so constructed that a full size original of one kind and a half size to this full size original are placed on the abovementioned original stacking table, while two kinds of paper cassettes corresponding in size to the full and half size originals are loaded in the apparatus. By this arrangement, the image transfer from the original to the transfer paper can be carried out in exact conformance in size, and, moreover, the full size recording paper can be folded into two, whereby all the recording paper to be discharged to the tray 6 can be made the same size. Further, when a plurality of the original size detection switches are provided, by the outputs of which the original size is made to be discriminated such as A-3, B-4, etc., it is possible to select the accurately coincided paper from the cassette loaded in the reproduction apparatus, thereby successfully recording the original onto the paper.

Figure 9A:
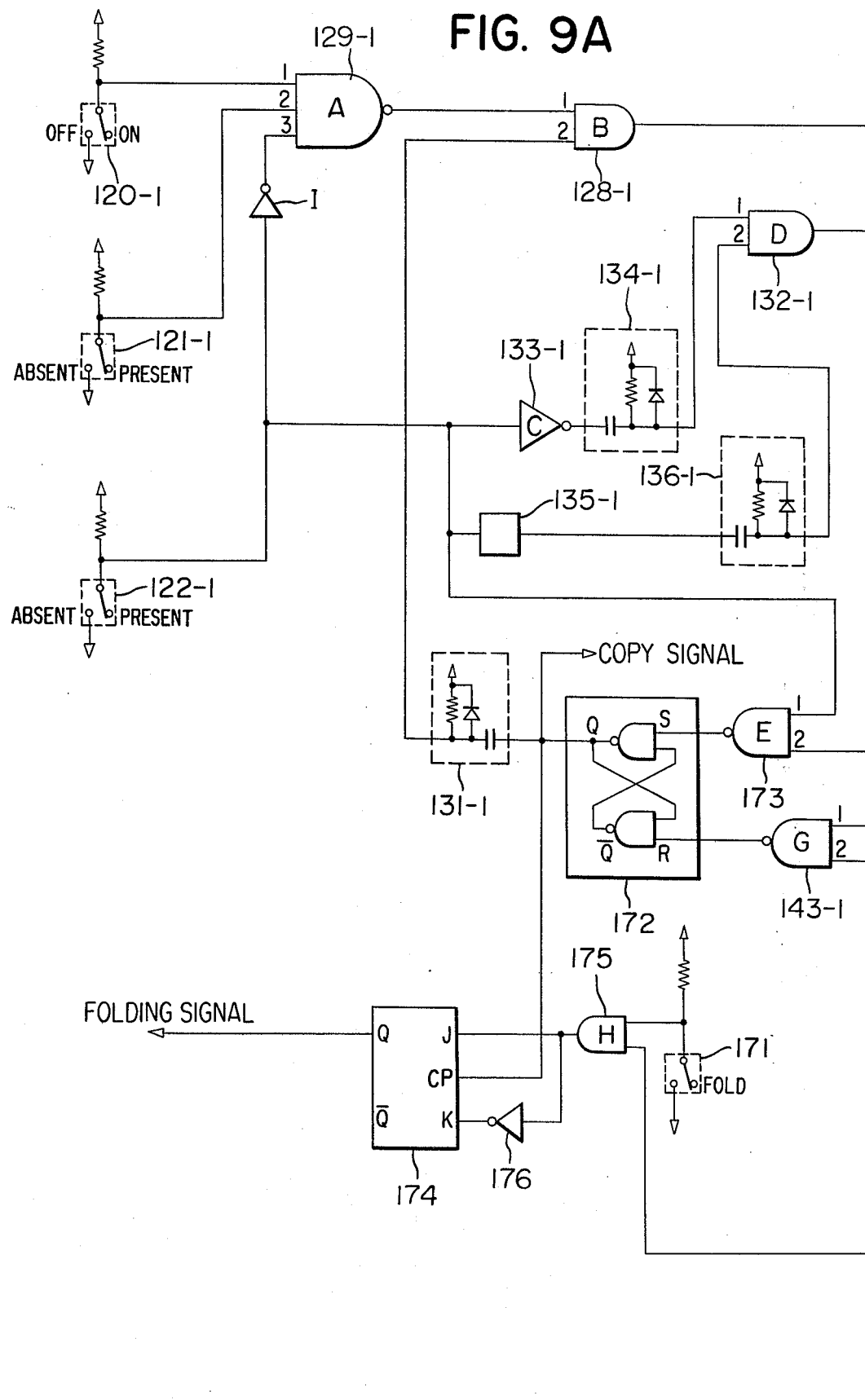
FIG. 9 is also a circuit diagram showing a main part of another embodiment of the control circuit for the recording device of the present invention.
Figure 10A:
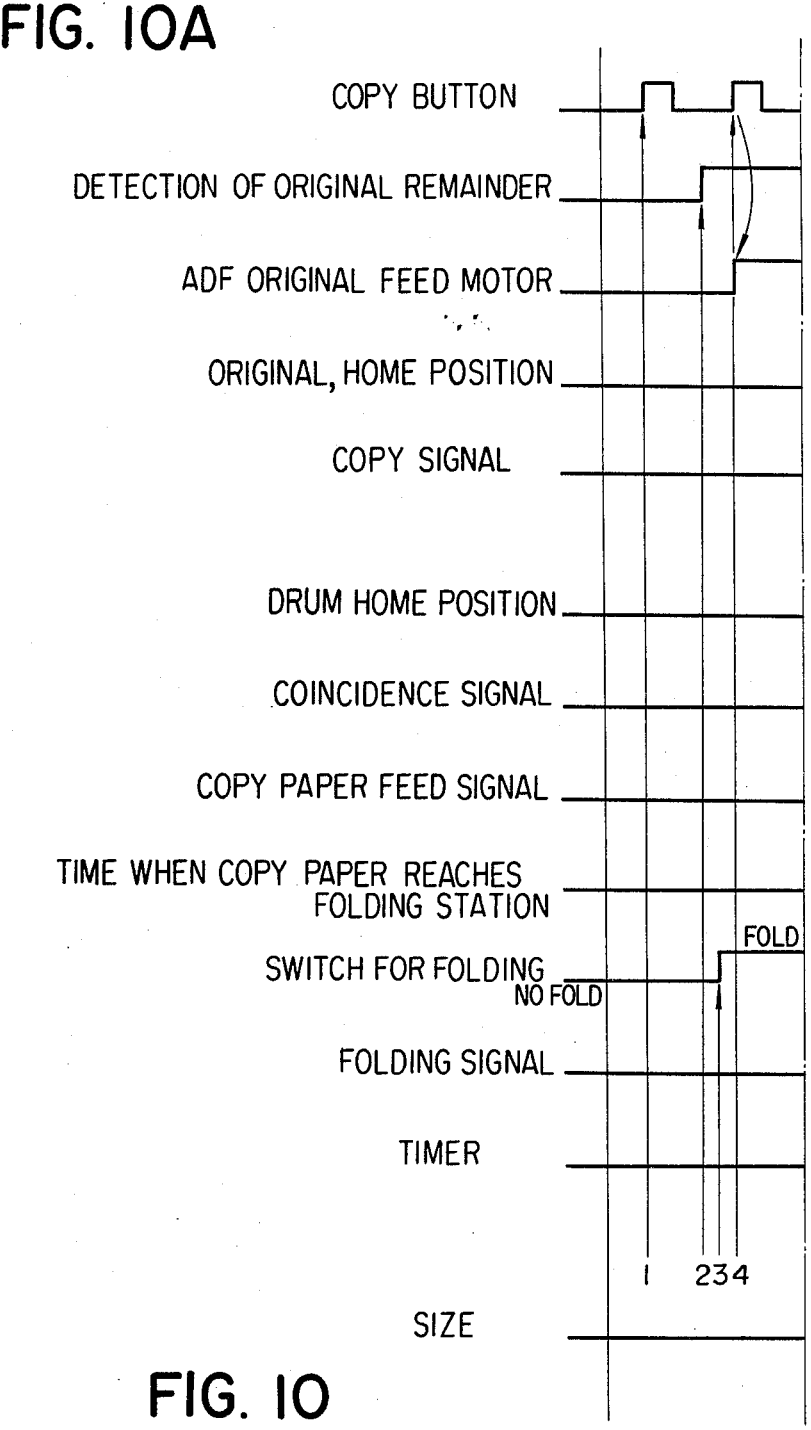
FIG. 10 is a signal waveform chart showing operative states of the recording device incorporating therein the circuit shown in FIG. 9.
Figure 10:
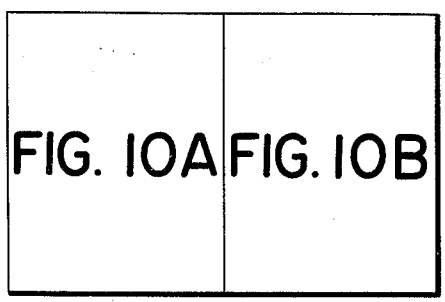
Figure 10B:
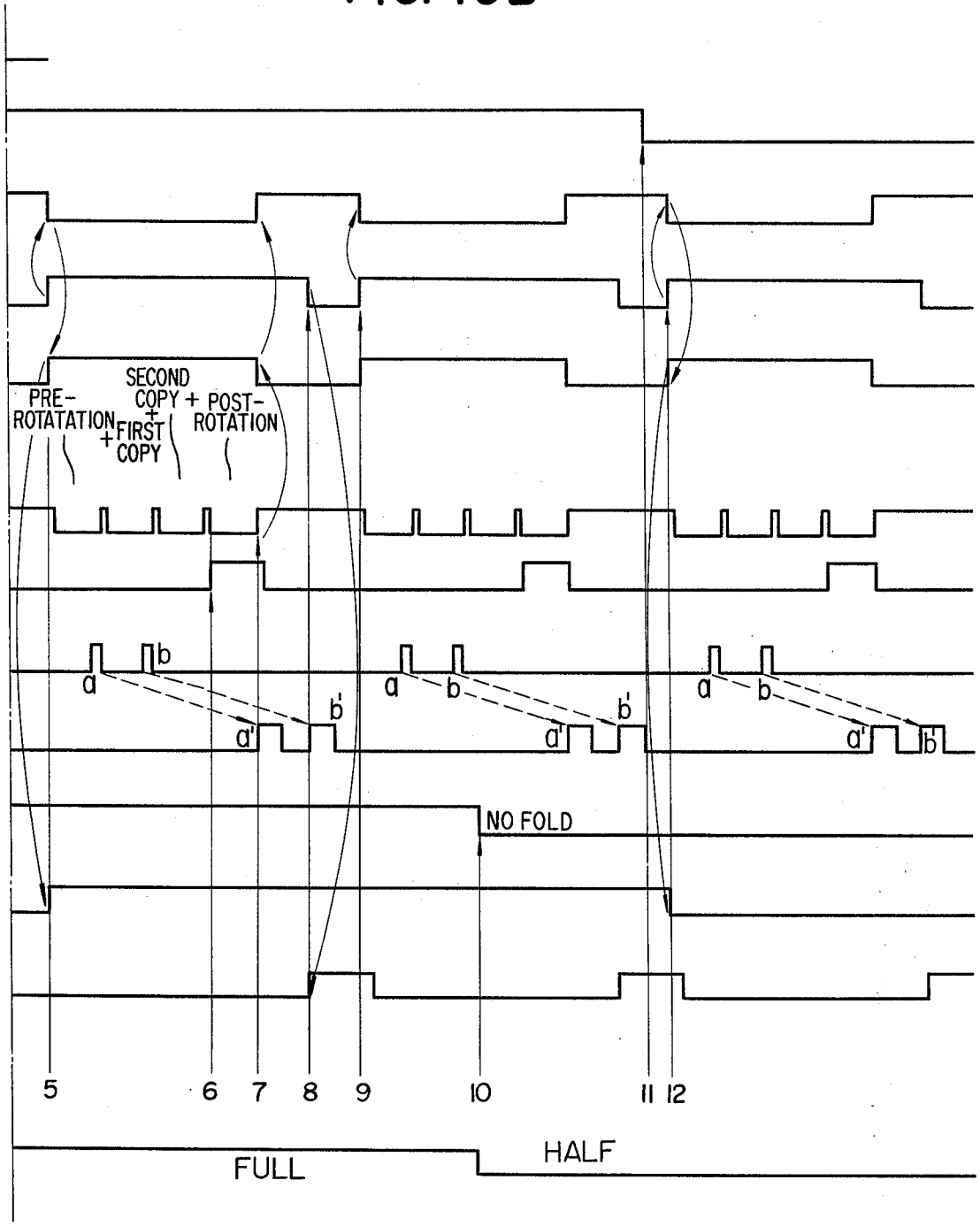

FIGS. 9 and 10 illustrate another embodiment of the control circuit for the recording apparatus according to the present invention. In the control circuit shown in FIG. 8, the upper or low cassettes are selected by the cassette selection switch 170 which is controlled manually, and the folding signal is generated by the manually controlled folding switch 171. In the control circuit of FIG. 9, the switches 123, 124 to discriminate the original size and the circuits related thereto as well as the coincidence circuit 140 and the circuits related thereto are all omitted. It should be noted that the circuit components in FIG. 9 which function in the same manner as those in FIG. 8 are designated by the same reference numerals with a suffix -1 being added thereto, hence detailed explanations thereof will be dispensed with.

Explaining the differences in FIG. 9 from FIG. 8, only two inputs are applied to the inputs of the NAND gate 173 connected to the set inputs of the flip-flop 172 which generates the copy signal. Accordingly, when the original reaches its home position, and the ADF signal trails, the copy signal is led out as indicated in the respective timings 5, 9 and 12 in FIG. 10. Also, an output of the AND gate 175 is applied to the JK-terminals of the JK flip-flop 174 which generates the folding signal either directly or through the inverter 176. To this AND gate 175, there are applied the output 3 (when this output is at the high level, the full size cassette is selected, and when it is at the low level, the half size cassette is selected, as already mentioned in the foregoing) of the selector, and the output of the folding switch 171. Accordingly, the folding instruction is issued from this AND gate 175 by means of the folding switch 171, and the high level signal is led out only when the full size cassette is selected. Thus, in the state of the high level signal being led out, the copy signal is applied, and the folding signal is led out of the output Q of the flip-flop 174.

What we claim is:

1. A recording device comprising:
   (a) mounting means for mounting an original carrying thereon image information to be recorded;
   (b) image recording means which reads the image information on the original placed on said mounting means by scanning the same, and which records the thus read image information as a visible image onto a recording medium comprising a flexible sheet;
   (c) conveying means for conveying the sheet recording medium, on which the visible image is formed by said image recording means;
   (d) engaging and stopping means which stops a selected sheet recording medium conveyed by said conveying means;
   (e) means for forming a signal representing a size of the flexible recording sheet;
   (f) means for controlling said stopping means to change the position thereof in accordance with the signal formed by said signal forming means; and
   (g) folding means which causes the sheet recording medium, a part of which is stopped by said engaging and stopping means, to continue forward movement, and causes said sheet recording medium to bend in response to said continued movement and to be folded in half, and to move for discharge outside of the device.

2. The recording device as claimed in claim 1, wherein said folding means is provided with a pair of opposed sheet holding means to fold said sheet recording medium in half.

3. The recording device as claimed in claim 1, further comprising storing means which temporarily stores the sheet recording medium which has been conveyed by said conveying means, said storing means being provided in one part thereof with said engaging and stopping means.

4. The recording device as claimed in claim 3, wherein said engaging and stopping means is provided in said storing means in such a manner that it may be projected into, and retracted from, the conveying path for said sheet recording medium.

5. The recording device as claimed in claims 1, 2, 3, or 4, further including means for guiding said sheet recording medium which is conveyed by said conveying means toward said engaging and stopping means.

6. A recording device comprising:
   (a) image forming means to form a visible image on a recording medium in a flexible sheet;
   (b) transfer means which transfers the sheet recording medium, on which the visible image has been formed by said image forming means;
   (c) first discharge means which folds the imaged sheet recording medium in half, and discharges the same out of the device;
   (d) second discharge means which discharges said imaged sheet recording medium without folding the same; and
   (e) selection means to select whether said sheet recording medium transferred by said transfer means is to be introduced into said first discharge means, or into said second discharge means.

7. The recording device as claimed in claim 6, wherein said first discharge means includes:
   engaging and stopping means which engages and stops a part of a selected sheet recording medium;
   guide means to guide said sheet recording medium to said engaging and stopping means;
   forwarding means to forward said sheet recording means transferred by said transfer means into said guide means; and
   drawing means to grip said sheet recording medium which has been stopped by said engaging and stopping means and which has been folded thereover by being further forwarded by said forwarding means, and to draw the same out of said guide means.

8. The recording device as claimed in claim 7, wherein said drawing means constitutes said second discharge means.

9. The recording device as claimed in claim 7 or 8, wherein said selection means comprises means for selecting whether said sheet recording medium is to be introduced into said guide means, or into said drawing means.

10. The recording device as claimed in claim 7, wherein said selection means includes means for suspending the operation of said forwarding means, when said sheet recording medium is introduced into said first discharge means by said selection means.

11. The recording device as claimed in claim 7, wherein said selection means includes means for selecting whether said sheet recording medium which has been transferred by said transfer means is to be introduced into said forwarding means, or into said second discharge means.

12. A recording device comprising:
   (a) image forming means to form a visible image on a flexible-sheet recording medium;

(b) size notifying means for giving notification of the size of the sheet recording means to be subjected to image-recording by said image forming means;
(c) sheet folding means for folding the sheet recording medium on which image recording has been made by said image forming means;
(d) determination means for determining whether or not the imaged sheet recording medium is to be forwarded to said sheet folding means; and
(e) control means for operation when visible image formation on the sheet recording medium of a particular size is notified by said size notifying means, to forward said sheet recording medium to said sheet folding means in response to a determination by said determination means.

13. The recording device as claimed in claim 12, wherein said image forming means includes a plurality of sheet recording medium storage means, which store therein different respective sizes of the sheet recording mediums, and storage instruction means which instruct said sheet recording medium storage means from which the sheet recording medium is to be taken out.

14. The recording medium is claimed in claim 13, wherein said image forming means includes size discrimination means for discriminating the size of the sheet recording mediums stored in said sheet recording medium storage means.

15. The recording medium as claimed in claim 14, wherein said image forming means includes size discrimination selection means which selects an output from the size discrimination means for the sheet recording medium storage means as instructed by said storage instruction means.

16. The recording medium as claimed in claim 15, wherein said control means includes folding instruction means which instructs the folding of the sheet recording medium by said sheet folding means, and instruction control means for controlling the forwarding of said sheet recording medium into said sheet folding means when said folding instruction means provides the folding instruction and when the sheet recording medium is correctly selected by said size discrimination selection means.

17. A recordng device comprising:
(a) original mounting means for mounting thereon an original carrying image information to be recorded;
(b) image recording means which reads the image information on said image original placed on said image original mounting means by scanning the same, and records said image information as a visible image on a flexible sheet recording medium;
(c) original size notifying means for giving notification of the size of the original carrying thereon said image information to be recorded;
(d) recording medium folding means which folds the imaged sheet recording medium;
(e) folding determination means for determining whether or not the imaged sheet recording medium is to be forwarded to said recording medium folding means; and
(f) folding control means for operation, when notification is made by said original size notifying means that the original is a predetermined size, to control the forwarding of said sheet recording medium to said recording medium folding means in response to a determination by said determination means.

18. The recording device as claimed in claim 17, wherein said original size notifying means consists of original size discrimination means which includes a plurality of sheet detectors for discriminating sizes of the originals.

19. The recording device as claimed in claim 18, further including sheet selection means which selects the sheet recording medium having a size conformed with the size discriminated by said image original size discrimination means.

20. The recording device as claimed in claim 19, further including a plurality of sheet recording medium storing means which store therein sheet recording mediums in different sizes, and storage instruction means which instructs said sheet recording medium storing means for taking out the sheet recording medium.

21. A recording device comprising:
(a) image forming means for forming a visible image on a recording medium in a flexible sheet, wherein said image recording means forms the visible image on said sheet recording medium in accordance with predetermined sequences;
(b) sheet folding means for folding the sheet recording medium, on which recording has been done by said image forming means;
(c) determination means for determining whether or not the imaged sheet recording medium is to be forwarded to said sheet folding mean;
(d) instruction means for generating an instruction signal to initiate folding of the sheet recording medium by said sheet folding means;
(e) instruction memory means for storing therein the instruction signal generated in said instruction means, and for forwarding said sheet recording medium to said sheet folding means in response to a determination by said determination means; and
(f) means for controlling the timing for storing said instruction signal in said instruction memory means to conform to a predetermined timing sequence.

22. The recording device as claimed in claim 21, further including clearing means for clearing the instruction signal stored in said instruction memory means.

23. The recording device as claimed in claim 21, wherein said instruction means consists of manually operative switches.

24. The recording device as claimed in claim 21, wherein said instruction means consists of a plurality of switches, logical gates to produce logical outputs of the outputs from said switches, and memory means to be controlled by the outputs from said logical gates.

25. The recording device as claimed in claim 21, 22, 23 or 24, wherein said instruction memory means consists of flip-flop circuits.

26. A recording device comprising:
(a) means for mounting an original carrying image information to be recorded;
(b) image recording means which reads the image information on the original placed on said original mounting means by scanning the same, and records the image information as a visible image on a flexible sheet recording medium;
(c) means for storing therein numbers of copy sheets to be repeatedly recorded on said sheet recording mediums from one and the same image original;
(d) image-recorded sheet number storage means for storing numbers of said sheet recording mediums which have been repeatedly recorded from one and same image original;

(e) coincidence detection means to detect coincidence of the contents of said storage means for copy sheets and the contents of said image-recorded sheet number storage means;

(f) recording medium folding means for folding the sheet recording medium; on which recording has been made by said image recording means;

(g) folding determination means to determine whether or not said sheet recording medium, on which recording has been made by said image forming means, is to be forwarded to said recording medium folding means;

(h) instruction means for generating signals for instructing folding of the sheet recording medium by said sheet folding means;

(i) instruction memory means for storing the instruction signals generated from said instruction means, and for instructing forwarding of said sheet recording medium to said sheet folding means in response to a determination by said determination means; and (j) memory clearing means to clear said instruction memory means after said detection of coincidence by said detection means, and after said instruction means has ceased its generation of said instruction signals.

27. The recording device as claimed in claim 26, wherein said instruction memory means is so constructed as to be controlled, as least, by said instruction means and said coincidence detection means.

28. A recording device comprising:

(a) image forming means for forming a visible image on a flexible-sheet recording medium;

(b) memory means for storing repeating numbers which define the number of times for repetitive formations of one and same visible image on a plurality of sheet recording mediums by said image forming means;

(c) sheet folding means to fold the imaged sheet recording mediums; and (d) means for permitting formation of a new visible image on sheet recording mediums by said image forming means, after one and same visible image is formed on said sheet recording mediums for the number of repeating times as stored in said repeating times memory means, and after all of the imaged sheet recording mediums pass through said sheet folding means.

29. The recording device as claimed in claim 28, wherein said permitting means further includes means which, when a visible image is to be formed within a range of copy sheet numbers established in said repeating times memory means, effects the image recording on the subsequent sheet recording medium before the previous sheet recording medium on which the image recording has been made passes through said sheet folding means.

30. A recording device comprising:

(a) means for mounting an original carrying image information to be recorded;

(b) image recording means which reads the image information on the original placed on said original mounting means by scanning the same, and records said image information as a visible image on a flexible sheet recording medium;

(c) lifting means to raise the sheet recording medium, on which the visible image has been recorded by said image recording means, to a position higher than said original mounting means;

(d) sheet recording medium folding means to fold the sheet recording medium lifted up by said lifting means; and (e) a tray to receive therein the sheet recording medium as folded by said sheet recording medium folding means, said tray being provided at a position higher than said original mounting means.

31. The recording device as claimed in claim 30, wherein said sheet recording medium is placed at a position higher than said image original mounting means.

32. The recording device as claimed in claim 30, wherein said sheet recording medium folding means includes sheet engaging and stopping means which engages and stops a part of the sheet recording medium as lifted by said lifting means, and first folding means which further carries the sheet recording medium a part of which is engaged and stopped by said engaging and stopping means, and causes said sheet recording medium to fold in half during further conveying action.

33. The recording device as claimed in claim 30, 31 or 32, wherein said lifting means consists of a belt and rollers press-contacted to said belt.

34. The recording device as claimed in claim 30, further including discharge means which discharges the sheet recording medium, on which the image recording has been made by said image recording means, at a position lower than said original mounting means, and transfers the same over to said lifting means.

35. The recording device as claimed in claim 34, wherein said lifting means includes sheet guiding means to guide the sheet recording medium, which has been discharged from said discharge means, to said lifting means.

36. A recording means comprising:

(a) image forming means for forming a visible image on a flexible-sheet recording medium;

(b) transfer means to transfer said sheet recording medium, on which the visible image has been formed by said image forming means;

(c) first discharge means to discharge said sheet recording medium transferred by said transfer means in a folded state;

(d) second discharge means to discharge said sheet recording medium, transferred by said transfer means, without being folded;

(e) selection means to select whether said sheet recording medium transferred from said transfer means is to be introducced into said first discharge means, or into said second discharge means; and (f) a discharge tray to receive the sheet recording mediums discharged from both said first and second discharge means.

37. The recording device as claimed in claim 36, wherein said second discharge means constitutes a part of said first discharge means.

38. The recording means as claimed in claim 36, wherein said first discharge means includes:
engaging and stopping means which engages and stops a part of a selected sheet recording medium;
guide means to guide said sheet recording medium to said engaging and stopping means;

forwarding means to forward said sheet recording means transferred by said transfer means into said guide means; and drawing means to grip said sheet recording medium which has been stopped by said engaging and stopping means, and to fold said medium by further forwarding by said forwarding means, and to draw the same out of said guide means.

39. The recording device as claimed in claim 38, further including discharge and transfer means to transfer said sheet recording medium, drawn from said guide means by said drawing means, to said discharge tray.

40. A recording device comprising:
(a) original mounting means for mounting thereon an original carrying image information to be recorded;
(b) image original feeding means for feeding the image original onto said image original mounting means, wherein said original feeding means is provided at one part thereof with original discrimination means for discrimination the size of the image original;
(c) image recording means which reads the image information on the original placed on said original mounting means by scanning the same, and records the image information as a visible image on a flexible-sheet recording medium;
(d) original detection means for detecting the arrival of the original fed from said original feeding means onto said original mounting means at a predetermined position thereof;
(e) recording start instruction means to instruct the recording on the sheet recording medium in response to a detected output of said image original detection means;
(f) conveying means to convey the imaged sheet recording medium;
(g) engaging and stopping means to engage and stop further movement of a sheet recording medium conveyed by said conveying means; and
(h) folding means to further convey the sheet recording medium, a part of which is engaged and stopped by said engaging and stopping means, and to fold and transfer said sheet recording medium in response to further movement of said medium during its said engagement with said engaging means.

41. A recording device as claimed in claim 40, further including:
(a) original discharge means which discharges from the device the original on said original mounting;
(b) timing means which is actuated in synchronism with discharge of the original by said original discharge means; and
(c) original feeding stoppage means which stops operations of said original feeding means which said original detection means does not detect arrival of the original within a timing of a certain definite time by said timing means.

* * * * *

UNITED STATES PATENT AND TRADEMARK OFFICE
CERTIFICATE OF CORRECTION

PATENT NO. : 4,202,621           Page 1 of 2
DATED      : May 13, 1980
INVENTOR(S): SHIGERU YOSHIMURA, ET AL It is certified that error appears in the above-identified patent and that said Letters Patent are hereby corrected as shown below:

IN THE ABSTRACT

Line 5, change "into" to --onto--;

Line 9, after "information" delete --in the original--;

Col. 1, line 63, change "it is other" to read "It is another--;

Col. 1, line 67, change "other" to --another--;

Col. 3, line 67, change "tension" to --voltage--;

Col. 4, line 35, after "detachable" add a hyphen;

Col.16, line 13, change "menas" to --means--;

Col.17, line 45, change "recordng" to --recording;

Col.19, line 32, change "as least" to --at least--;

UNITED STATES PATENT AND TRADEMARK OFFICE
CERTIFICATE OF CORRECTION

PATENT NO. : 4,202,621

DATED : May 13, 1980

INVENTOR(S) : SHIGERU YOSHIMURA, ET AL.

It is certified that error appears in the above-identified patent and that said Letters Patent are hereby corrected as shown below:

Col. 20, line 55, change "introducced" to --introduced--;

Col. 21, line 22, change "discrimination" to --discriminating--.

Signed and Sealed this

Twenty-first Day of October 1980

[SEAL]

Attest:

SIDNEY A. DIAMOND

Attesting Officer — Commissioner of Patents and Trademarks